G. A. MEACHAM.
Hand-Seeder.
No. 16,929.
Patented Mar. 31. 1857.
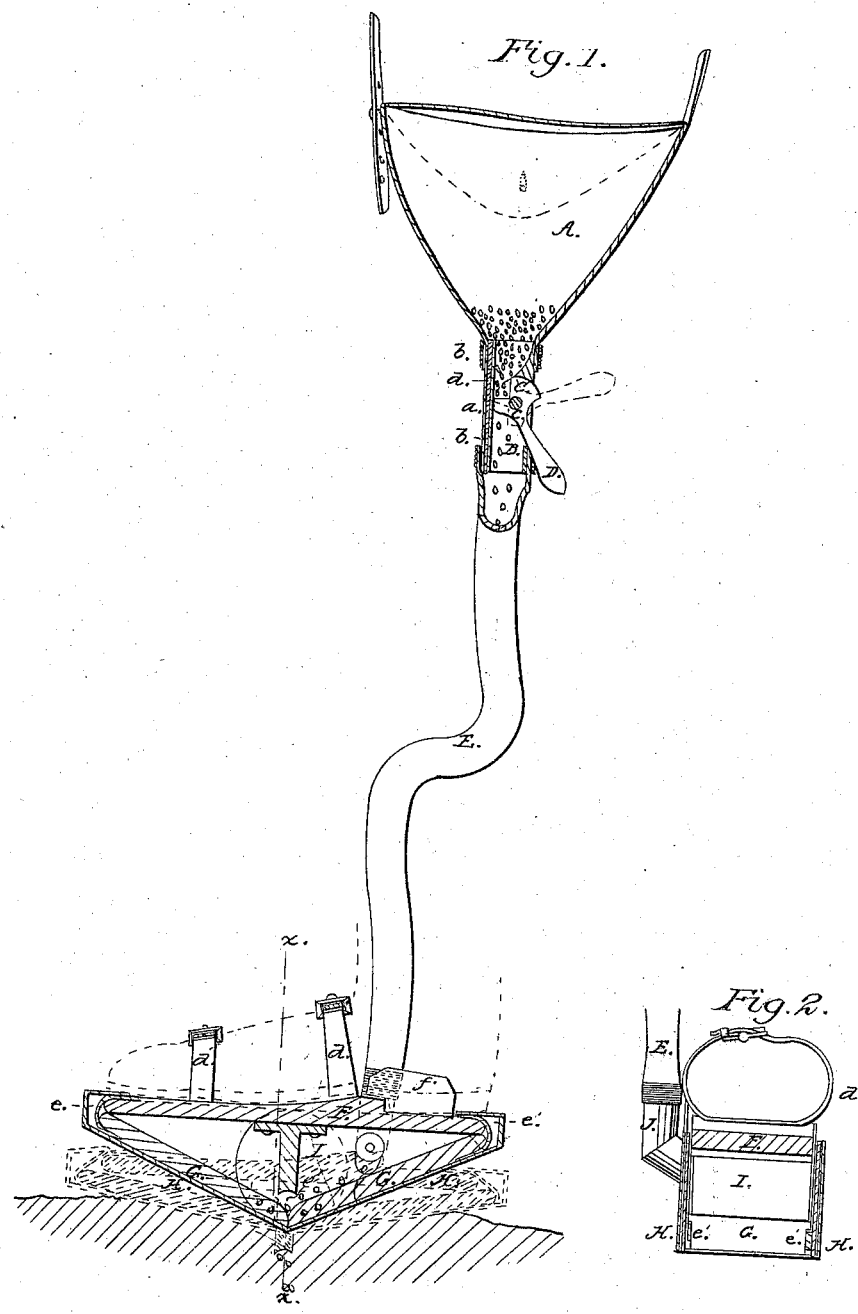

UNITED STATES PATENT OFFICE.

GEO. A. MEACHAM, OF NEW YORK, N. Y.

IMPROVEMENT IN SEED-PLANTERS.

Specification forming part of Letters Patent No. 16,929, dated March 31, 1857.

*To all whom it may concern:*

Be it known that I, GEORGE A. MEACHAM, of the city, county, and State of New York, have invented a new and improved implement or device for planting corn and other seeds by means of the hand and the pressure of the foot; and I do hereby declare that the following is a full, clear, and exact description of the same, reference being had to the accompanying drawings, making a part of this specification, in which—

Figure 1 is a vertical section of my improvement. Fig. 2 is a detached vertical section of the planting device, $x\ x$, Fig. 1, showing the plane of section.

Similar letters of reference indicate corresponding parts in both figures.

My invention consists in the employment or use of a planting device which is attached to the foot of the operator, and a distributing or measuring device placed at the lower end of a sack or seed-receptacle which is attached to the waist of the operator, the said sack or receptacle communicating with the planting device by means of an elastic tube, the above parts being so arranged that the seed is measured by operating the distributing device by hand, the seed passing down into the planter in proper quantities at each time and being deposited or forced into the ground by the action or pressure of the foot, as will be hereinafter fully shown and described.

To enable those skilled in the art to make and use my invention, I will proceed to describe its construction and operation.

A represents a sack or receptacle, made of cloth, leather, or other proper material. This sack or receptacle is secured to the operator by means of a strap passing around the waist. The sack or receptacle A should be of funnel or conical form, and to its lower end a metallic box, B, is attached. This box has only three sides—that is, only three metallic sides. The other side is formed of a sheet of india-rubber, $a$, or other suitable elastic material, the said india-rubber or elastic material being stretched over a frame, $b$, which may be secured to the box B in any proper manner.

In the box B a head, C, of segment form, is placed. This head works on an axis or rod, $c$, which passes transversely through the box B. The width of the head C is equal to that of the box B, and the head is provided with a handle, D, which projects through an opening in the side of the box B. The head C has a V-shaped groove or recess, $d$, made in it, said groove extending the whole width of the head. The head C cuts off all communication between the upper and lower ends of the box B when the handle D is depressed, as shown clearly in Fig. I, because the head extends the whole width of the box, and its inner edge bears against the india-rubber $a$.

To the lower end of the box B an elastic tube, E, is attached.

F represents a board, which is secured to the bottom of the foot by straps $d'\ d'$. This board is about equal to the length of the foot, and an inclined board, G, is attached to each end of the board F by elastic straps $e$, the lower ends of the boards G G being connected by elastic straps $e'$. To the under sides of the boards G G metal plates H H are attached by screws. These plates H H cover the under surfaces of the boards G G and extend upward at each side, forming a box, the inner ends of the side pieces of the plates H H overlapping each other.

To the under side of the board F a pendent plate, I, is attached at about the center of the board F. The lower end of this plate I, when the board F is not depressed, extends downward nearly to the angle formed by the inner ends of the two boards G G.

The lower end of the tube E is connected with a pipe, J, which is attached to the side of one of the plates H H. The tube E therefore affords a communication between the box B and the box or space between the boards F G G.

The boards F G G and plates H H form what may be termed the "planting" device. The box B, provided with the head C, may be termed the "distributing" or "measuring" device.

To the board F, at one side, a vertical plate, $f$, is attached. This plate serves as a cut-off, as will be presently seen.

The operation is as follows: The planting device is secured to the foot and the sack or receptacle A is secured to the waist of the operator. By raising the handle D with the hand the operator will cause a certain amount of seed to pass down the tube E as the groove or recess $d$ is filled, and when the handle D is raised the groove or recess $d$ will pass around below the rod or axis $c$ of the head C, and the seed will fall from the recess by its own gravity. Thus it will be seen that an equal amount of seed will be allowed to pass down the pipe E each time the handle D is operated. This distributing or measuring device cannot become choked or clogged and rendered inefficient thereby, for the elastic side $a$ will yield or "give," and for the same reason the seed cannot be cut, chafed, or bruised, as it is liable to be in most distributing devices. The seed as it is measured by the head C passes down the tube E into the box formed by the boards F G G, and the seed passes down into the angle formed at the junction of the two lower ends of the boards G G. The foot is then pressed down, and the boards G G, in consequence of the pressure to which they are subjected, are shoved or forced outward from each other, the elastic straps $e'$ $e$ yielding or "giving," and the plate I is forced down between the inner or lower ends of the two boards G G and plates H H, the plate I pressing or forcing the seed into the soil, as shown in red color in Fig. 1. When the planting device is relieved from the pressure of the foot the boards return to their original position by means of the elastic straps $e$ $e'$. When the board F is depressed the plate $f$ covers the orifice of the pipe J and prevents any seed from casually passing into the planter.

The above-described machine has been practically tested and operates well. The measuring and distributing device and the planting device being kept distinct, the parts are not liable to get out of repair. The device is also rendered more simple and efficient by this arrangement, one part not interfering with the perfect operation of the other.

Having thus described my invention, what I claim as new, and desire to secure by Letters Patent, is—

1. The box B, provided with the elastic side $a$ and the head C or its equivalent, for the purpose of distributing or measuring the seed.

2. The "planter" attached to the foot of the operator and formed of the boards F G G, connected by the elastic straps $e$ $e'$, the boards G G having the plates H H attached to them, and the under side of the board F the plate I attached, the whole being arranged, substantially as described, for the purpose of planting or forcing the seed into the soil by the pressure of the foot.

G. A. MEACHAM.

Witnesses:
W. TUSCH,
J. F. BUCKLEY.